INVENTOR.
Edwin H. Land
BY Brown and Mikulka
and
John H. Coult
ATTORNEYS

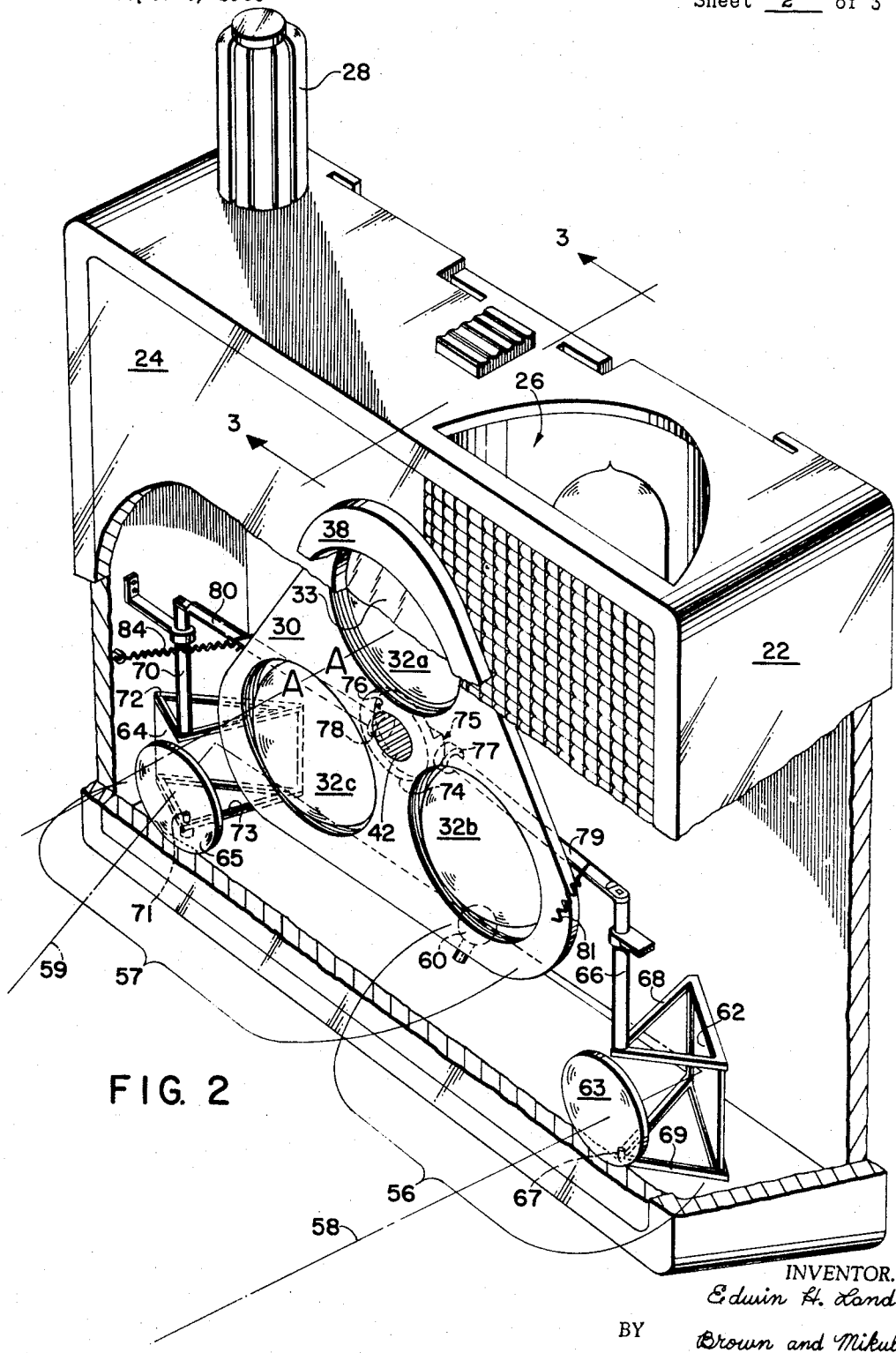

Dec. 31, 1968   E. H. LAND   3,418,908
RANGE FINDING-FOCUSING APPARATUS FOR A PHOTOGRAPHIC CAMERA
Filed Sept. 6, 1966   Sheet 3 of 3
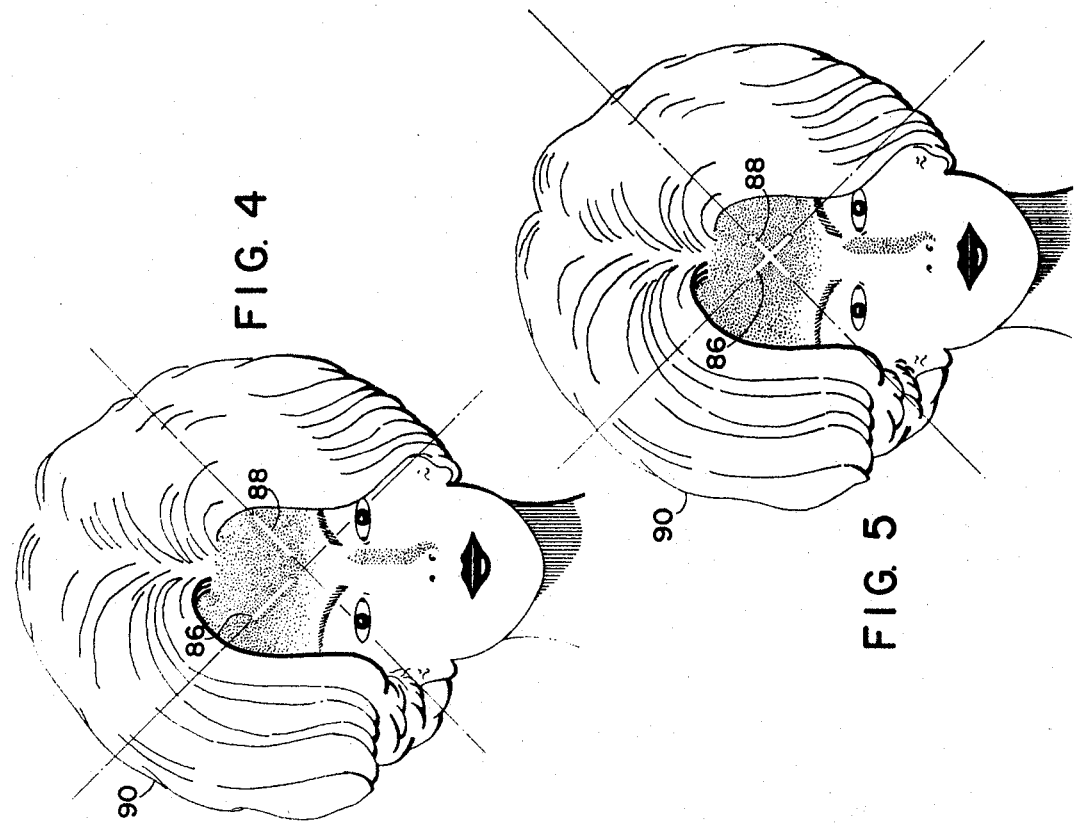
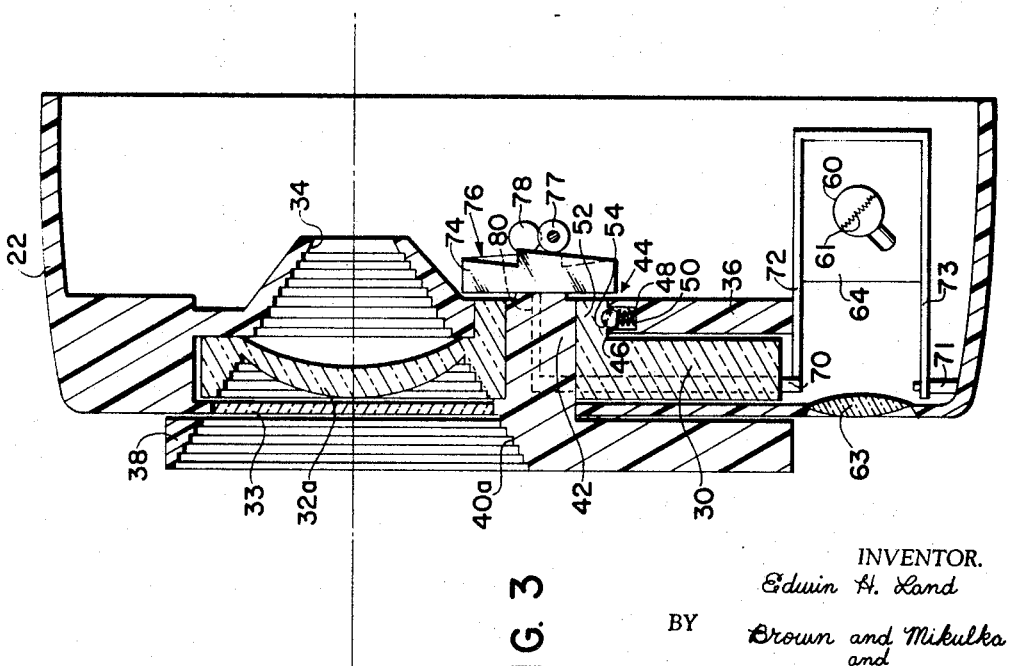
INVENTOR.
Edwin H. Land
BY Brown and Mikulka
and
John H. Coult
ATTORNEYS

United States Patent Office 3,418,908
Patented Dec. 31, 1968

3,418,908
RANGE FINDING-FOCUSING APPARATUS FOR A PHOTOGRAPHIC CAMERA
Edwin H. Land, Cambridge, Mass., assignor to Polaroid Corporation, Cambridge, Mass., a corporation of Delaware
Filed Sept. 6, 1966, Ser. No. 577,413
20 Claims. (Cl. 95—45)

This invention relates to photographic apparatus, and more particularly to combined range finding-focusing apparatus for a photographic camera.

The apparatus for accomplishing the focusing function in many low cost cameras has, because of the very stringent cost limitations imposed, been limited to a single fixed-focus objective lens. Such single lens, fixed-focus arrangements are capable of providing a satisfactory focus of the image of a photographic subject on the film plane of a camera in certain photographic conditions, for example, in high level lighting conditions or other conditions wherein a relatively small exposure aperture may be used to provide considerable depth of field. However, in low level lighting conditions or when low-speed films are used, for example, the exposure aperture preferably is enlarged. Accordingly, the depth of field narrows and the ability of the focus-producing arrangement to provide focus adjustments becomes more critical.

This invention concerns range finding-focusing apparatus for a camera including focusing means which provides adjustable focus capability for a camera while preserving certain cost advantages of a fixed-focus system.

A range finder is, of course, a necessary concomitant of apparatus for providing focus adjustability for a camera. It is desirable that the range finding apparatus provided in a camera having low-cost focusing apparatus also be inexpensive in order to preserve or preferably to enhance the cost advantages secured by the use of such focusing apparatus. This invention contemplates the provision of low-cost range finding apparatus coupled to inexpensive focusing apparatus which is effective to indicate when a proper focus has been achieved by such focusing apparatus.

The range finding apparatus of the invention is especially adapted for use indoors or in other low light level conditions and may include means for projection upon the subject two focused light beams which are angularly variable relative to each other. The angle between the beams when the beams are made to converge at the subject indicates the subject-to-camera distance.

In the range finder of this invention, the beams carry information rendering respective areas on the subject illuminated by the beams distinguished from each other. Thus, the direction in which to vary the relative angular displacement of the beams to bring the beams into a condition of convergence at the subject is suggested to the operator. With this feature the operator is able to more quickly and easily ascertain the range of the subject.

Accordingly, it is an object of this invention to provide range finding-focusing apparatus for a photographic camera comprising focusing means coupled to a two-beam range finder for accomplishing rapid, accurate, and facile focus adjustments which apparatus is especially effective in low light level conditions.

It is another object of this invention to provide range finding-focusing apparatus for a photographic camera including two-beam range finding means in which beams projected from the camera carrying information rendering respective areas on the subject illuminated by the beams distinguishable from each other to assist in indicating to the operator the direction in which angular adjustment of the beams should be made to bring them into convergence at the photographic subject to indicate the range of the subject.

It is still another object of this invention to provide two-beam range finding means having projection lens means for focusing the range finding beams and means for varying the foci of the projection lens means.

It is a further object of this invention to provide range finding apparatus for a photographic camera including focusing means which is capable of effecting focus adjustments without the need for motion-producing means for translating an optical element along the optical axis of the camera.

It is yet another object of this invention to provide range finding-focusing apparatus for a photographic camera which is relatively inexpensive to produce and which is simple in structure and operation.

Briefly, one structural implementation of the invention may include focusing means comprising a manually rotatable lens turret carying a plurality of lenses of different focal length for succesive movement across the optical axis of the camera. Range finding means are provided for indicating which of the lenses provides a proper focus of the image of a selected subject on an image plane within the camera. The range finding means may be of the general type which includes means for projecting two spaced light beams from the camera to the subject. In such rangefinders at least one of the beams is made to be angularly variable with respect to the other beam, usually in a plane containing both beams such that the intersection of the beams at the subject indicates the subject-to-camera distance. The range finding means is coupled to the focusing means in a novel combination having the property that the appropriate lens for a given subject distance is indicated by the location of that lens over the exposure aperture when the beams most nearly approach the condition of intersection at the subject distance. Preferably, projection lens means are provided for focusing the beams and further novel means are included for varying the foci of the projection lens means in correlation with variations in the angular displacement of the light beams. To indicate to the operator the direction in which to adjust the angular displacement of the beams to converge the beams quickly at the subject, novel means are provided for causing the beams to carry information rendering the illuminated areas produced by the beams on the subject readily distinguishable.

The invention accordingly comprises the apparatus possessing the construction, combination of elements and arrangement of parts which are exemplified in the following detailed disclosure, and the scope of the application of which is indicated in the claims.

For a fuller understanding of the nature and objects of the invention, reference should be had to the following detailed description taken in connection with the accompanying drawings wherein:

FIG. 2 is an enlarged view of the front assembly of the camera illustrated in FIG. 1 with certain non-essential components removed for the sake of clarity and with a portion of the assembly broken away to reveal in schematic form hidden elements;

FIG. 3 is a sectional view of the front assembly taken along lines 3—3 in FIG. 2;

Figure 1:
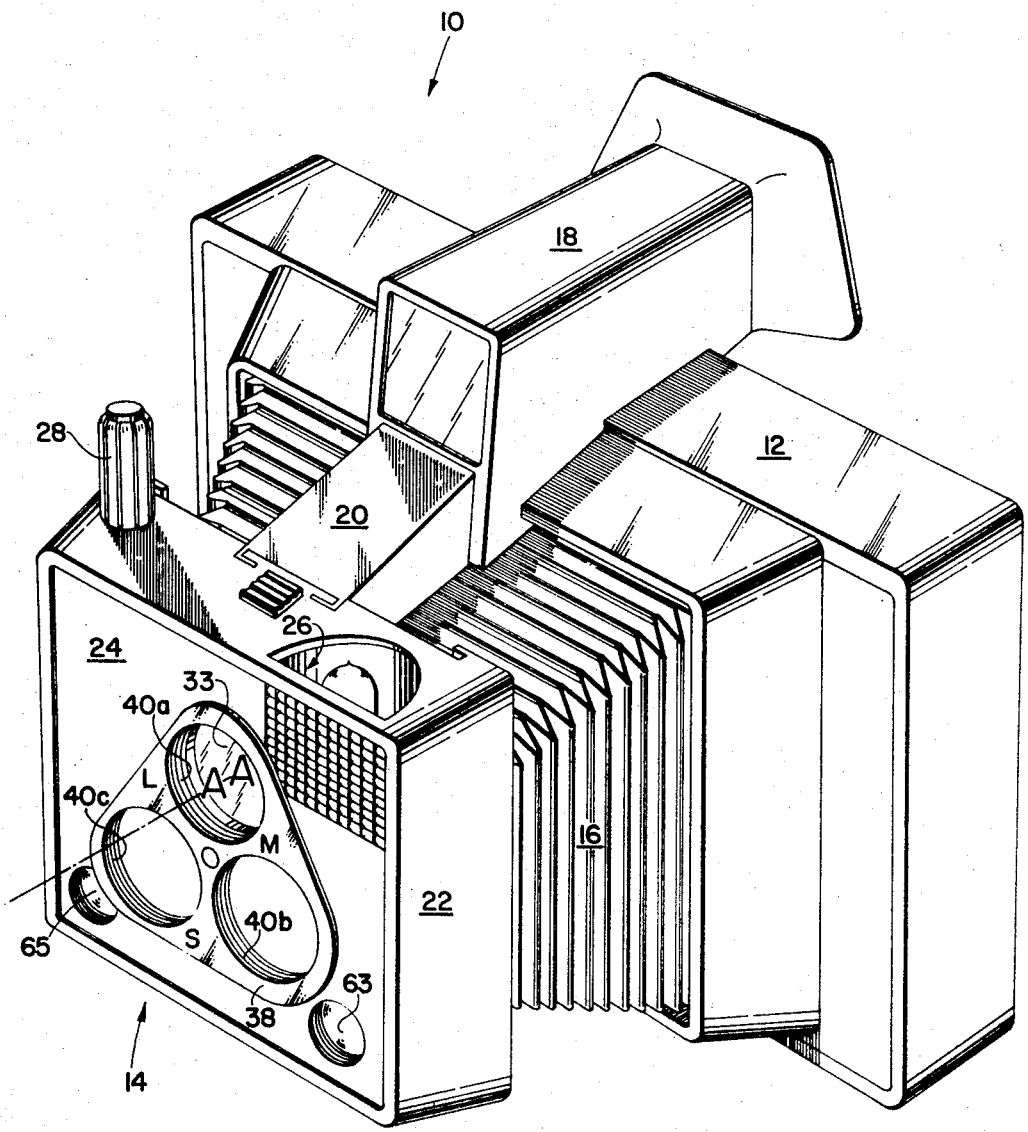
FIG. 1 is a perspective view of a photographic camera including a front assembly embodying exemplary range finding-focusing apparatus constructed in accordance with the invention.

FIG. 4 is a view of a hypothetical photographic subject illuminated by light beams from range finding apparatus constituting an aspect of the invention, the illuminated areas produced by the beams on the subject being separated, indicating that a proper focus of the image of the subject has not been achieved; and FIG. 5 is another view of the hypothetical subject shown in FIG. 4 but showing the illuminated areas as intersecting on the subject to indicate that a proper focus of the image of the subject has been achieved.

Many and diverse applications for the invention are contemplated. The drawings illustrate one possible structural implementation of the inventive concept. FIGURE 1 illustrates a camera including exemplary range finding-focusing apparatus constructed in accordance with the invention. A camera 10 is shown as comprising a back assembly 12, a front assembly 14 and a bellows 16 interconnecting the front and back assemblies 12, 14. A view finder assembly 18 mounted upon the back assembly 12 receives a rigid telescoping support member 20 interconnecting the back and front assemblies 12, 14, which serves as a support for the front assembly 14 when the camera 10 is opened. The front assembly 14 may include a housing 22 having a forward wall 24, built-in flash apparatus 26, and a shutter actuator 28.

In accordance with the objects of the invention, range finding-focusing apparatus is provided which includes low-cost focusing means for effecting focus adjustments within a camera. Referring also to FIGS. 2 and 3, focusing means constructed in accordance with the invention may include a rotatably mounted lens turret 30 mounting a plurality, for example three as shown, objective lens elements, 32a, 32b, and 32c. The lens elements 32a, 32b, 32c are designed to have focal lengths enabling the operator, by the selection of the proper lens element, to effect a satisfactory focus of the image of any photographic subject from, for example 3½ feet to infinity. For example lens element 32a might be designed to provide satisfactory focusing of the images of subjects at a range of subject distances from 10 feet to infinity, having a focal length of 100 millimeters with a midpoint setting of 20 feet. Lens element 32b might be designed to provide proper focusing for subjects at subject distances ranging from 5 feet to 10 feet, having a focal length of 96.9 millimeters with a midpoint setting of 80 inches. Lens element 32c for subject distances of 3½ feet to 5 feet might have a focal length of 94.2 millimeters with a midpoint setting of 48 inches. For economy of construction, the lens elements 32a, 32b, and 32c and the lens turret 30 are preferably molded into a single unit from transparent synthetic material having favorable optical properties, such as Plexiglas.

Photosensitive film materials (not shown) may be mounted on an image plane within the camera 10 for exposure along an optical axis A—A through a window 33 in forward wall 24 and through an exposure aperture 34 formed in an inner wall 36 of the housing 22.

In order that the lens elements 32a, 32b, and 32c may be selectively rotated onto the optical axis A—A, a selector wheel 38 may be provided. The selector wheel 38 may be formed in a shape similar to that of the lens turret 30 and may include orifices 40a, 40b, and 40c registered, respectively, with the lens elements 32a, 32b, and 32c. The orifices 40a, 40b, and 40c may be labeled with indicia appropriate to indicate the focal length of the lens element registered with that orifice. For example, the letters L, M, and S may be used, as shown in FIG. 1, to indicate lens elements having relatively long, medium, and short focal lengths, respectively. The selector wheel 38 may have a shaft 42 integral therewith keyed to the lens turret 30 and supported by the forward and inner walls 24, 36 of the housing 22. Each of the orifices 40a, 40b, and 40c in the selector wheel 38 may be marked to indicate which of the lens elements 32a, 32b or 32c is respectively associated with that orifice. With the described focusing apparatus, the operator is able to quickly and easily effect focus adjustments by manually rotating the selector wheel 38 until the desired lens is located on the optical axis A—A of the camera.

Detent means 44 may be provided for indexing the lens turret 30 in one of the three selectable angular positions in which one of the lens elements 32a, 32b, or 32c is disposed on the optical axis A—A. The detent means 44 may comprise a spherical member 46 in a cavity 48 opening on a bearing surface formed by the inner wall 36 of the housing 22. The sphere may be biased radially by a spring 50 into engagement with the peripheral outer surface of an annular shoulder 52 formed on the lens turret 30. Three recesses, one of which is designated 54 in FIG. 3, may be formed in the peripheral outer surface of shoulder 52 for receiving the spring-biased spherical member 46 when one of the three lens elements 32a, 32b, or 32c is precisely oriented on the optical axis A—A.

With focusing apparatus, capable of effecting focus adjustments such as the structure described above, range finding means must be provided for ascertaining the range of the selected photographic subject. In order to indicate to the operator which of the lens elements 32a, 32b, or 32c will provide a proper focus of the image of the selected subject, two-beam range finding apparatus may be provided. A two beam range finder is particularly useful in low level lighting conditions wherein a proper focusing is particularly critical because of the limited depth of field provided with the relatively large apertures useful in such conditions. The range finding apparatus may comprise first means for projecting a first beam of light from the camera to the subject, and second means displaced from the first means for projecting a second beam of light from the camera to the subject. At least one of the beams is made to be angularly variable with respect to the other beam and in a plane containing both beams in order that the angular separation of the beams when the beams are made to converge at the subject may be used to indicate the range of the subject.

The exemplary range finding apparatus depicted in FIGS. 1–3 comprises first means 56, and second means 57, respectively for projecting first and second light beams 58, 59 from the camera to a selected photographic subject. The first and second means 56, 57 are constructed to render each of the beams 58, 59 angularly variable with respect to each other in a common plane.

The first means 56 may comprise a lamp 60 having a filament 61, a movable planar mirror 62 and a projection lens 63 in the forward wall 24 of the housing 22. Similarly, second means 57 may comprise lamp 60, a movable planar mirror 64 and a projection lens 65 also located in the forward wall 24 of the housing 22.

It is desirable that the beams 58, 59, in addition to being angularly variable with respect to each other, be capable of being focused at least approximately at the subject in order that the areas on the subject illuminated by the beams 58, 59 may be readily discernable to the operator. In order to accomplish these ends, the mirrors 62, 64 may be mounted to pivot about respective vertical axes passing near the geometrical centers of projection lenses 63, 65, respectively.

Referring to the drawings, and especially to FIG. 2, the mirror 62 is supported on upper and lower rotatably mounted shafts 66, 67 by upper and lower yokes 68, 69. Similarly, mirror 64 is supported on a second pair of rotatably mounted shafts 70, 71 by yokes 72, 73. With the exemplary arrangement for mounting the mirrors 62, 64, as the mirrors 62, 64 are rotated away from each other, for example, as by means as described below, the beams 58, 59 will converge closer to the camera. Also, as the mirrors 62, 64 are rotated away from each other and away from the common light source, i.e., the heated filament 61 of lamp 60, the optical path $d$, $d'$ of the light from filament 61 to mirrors 62, 64 lengthens with the result that the beams 58, 59 will be focused at points progressively closer to the camera thus, because of the fact that the points at which beams 58, 59 are focused and the points of convergence of the beams 58, 59 progress in the same direction toward or away from the camera, the illuminated spots produced on the subject by the beams will remain satisfactorily sharp independently of the subject distance.

It is also evident that because the point of convergence of the beams 58, 59 moves only parallel to the optical axis A—A of the camera, and not transversely thereof, the beam-produced spots on the subject may be used by the operator as a rough indication of the field of view of the selected objective lens element, uncompensated, of course, for parallax error or field size changes.

In order to expedite focus adjustments for the camera, the range finding apparatus is preferably coupled directly to the focusing apparatus. Although many arrangements are contemplated by which a satisfactory coupling may be effected, one preferred arrangement (see FIGS. 2 and 3) may comprise a cam 74 mounted on the innermost end of the shaft 42 extending from the selector wheel 38. The cam 74 may include two identical 180° axial camming surfaces 75, 76, respectively, driving cam followers 77, 78 on radial arms 79, 80 extending from upper shafts 66, 70 respectively. Springs 81, 84 between the arms 79, 80 and the housing 22 may be provided for maintaining the cam followers 77, 78 in engagement with the camming surfaces 75, 76 of cam 74 at all times.

With a cam and cam follower coupling arrangement such as is illustrated, the angular displacement of the mirrors 62, 64 is automatically coordinated with the angular orientation of the lens turret 30. Thus, by a proper geometrical design of the first and second beams 56, 57 for producing the first and second beams 58, 59, the beams can be made to converge with satisfactory focus at a distance from the camera which corresponds to an appropriate subject distance for the lens element which is disposed on the optical axis A—A.

In order to assist the operator in ascertaining the direction in which to adjust the angular displacement of the beams 58, 59 to establish the condition wherein the beams intersect at the subject, the beams may carry information rendering respective illuminated areas, or spots, produced on the subject by the beams distinguishable from each other. Numerous arrangements may be devised for rendering the spots distinguishable; for example, the beam 58, 59 might be color coded. Alternatively, the beams might be shaped differently so as to produce spots distinguishable by their dissimilar configurations. In a simple but extremely advantageous arrangement for rendering the beam-produced spot distinguishable, as illustrated, the lamp 60 has a filament 61 which is generally linear in order that each of the light beams 58, 59 may have an elongated cross section. By orienting the lamp 60 with filament 61 at an angle with respect to a horizontal plane, for example, 45°, as illustrated in FIGS. 2 and 3 of the drawings, the first beam 58 will have an elongated cross section with its longest dimension along an axis which is angled approximately 90° with respect to the axis of the longest dimension of the cross section of beam 59.

Referring to FIG. 4, as the operator rotates the selector wheel 38 in search of a proper focus, the spots 86, 88 produced by beams 58, 59, respectively, on the hypothetical subject 90 will approach or depart, depending upon whether a condition of proper focus is approaching or departing. In FIG. 4 the beam-produced spots 86, 88 are shown spaced on the subject 90, indicating to the operator that the particular lens element disposed on the optical axis A—A will not provide a proper focus of a subject located at that particular subject distance. The operator, knowing that spot 86, angled upwardly to the left is produced by beam 58 and that spot 88 angled upwardly to the right is produced by beam 59, quickly learns by the relative positions of spots 86, 88 on the subject in the direction in which the lens wheel 30 should be rotated to bring the proper lens element onto the optical axis A—A.

As shown in FIG. 5, when the lens element which will provide a proper focus of the subject is rotated onto the optical axis A—A, the beam-produced spots 86, 88 intersect to focus an X-shaped area of illumination on the subject.

The operator knows from the geometry of the patterns produced on the subject by the spots 86, 88 whether the lens element on the optical axis at a particular time has a focal length which is too great or not great enough. In the condition illustrated by FIG. 4 wherein the angled spots 86, 88 converge toward a projected intersection point below the spots 86, 88, the operator knows that the lens element on the optical axis A—A has a focal length which is too long and that the selector wheel 38 (and hence the lens turret 30) should be rotated in the direction which will bring a lens element of shorter focal length onto the axis A—A. Conversely, if the spots 86, 88 are oriented on the subject such that the projected intersection point is above the spots, the operator is instructed to rotate the lens turret 30 to bring a lens element of longer focal length onto the axis A—A.

Although spots of many other shapes and/or relative orientations may be produced and satisfactorily used, the illustrated arrangement is particularly advantageous for the reasons enumerated above and because of the clarity and ease of recognition of the X-shaped illumination pattern produced at a condition of proper focus by this arangement.

Thus, by providing a two-beam range finder in which the spots 86, 88 produced by the beams 58, 59 are sharp and distinguishable, and preferably by forming elongated spots angled with respect to each other, the range of the subject and the field of view may be readily ascertained by the operator. By the further expedient, in accordance with the invention, of coupling the range finding apparatus to the focusing apparatus, the lens element providing a proper focus is selected automatically without the need for an intermediate step which might otherwise be required to convert the range measurement into a proper setting of the lens turret 30.

Since certain changes may be made in the above apparatus without departing from the scope of the invention herein involved, it is intended that all matter contained in the above description or shown in the accompanying drawings shall be interpreted as illustrative and not in any limiting sense.

What is claimed is:

1. In a photographic camera having an exposure aperture on an optical axis for exposing photosensitive materials in an image plane within the camera, range finding-focusing apparatus comprising:

a plurality of lens means of different focal length for focusing the images of photographic subjects at different subject distances upon said image plane;

mounting means for mounting said plurality of lens means for selective movement onto said optical axis;

range finding means for indicating the range of selected photographic subjects, and coupling means for coupling said mounting means and said range finding means such that said range finding means indicates when a lens means capable of providing proper focus of the image of a subject at a given subject distance has been moved into an operative position upon the optical axis.

2. In a photographic camera having an exposure aperture on an optical axis for exposing photosensitive materials in an image plane within the camera, range finding-focusing apparatus, comprising:

adjustable focusing means for focusing the images of photographic subjects at different subject distances upon said image plane;

range finding means for indicating the range of a selected photographic subject, comprising:

first means for projecting a first beam of light from the camera to the subject, and second means for projecting a second beam of light from the camera to the subject;

coupling means between said focusing means and at least one of said first and second means, said coupling means being responsive to a focus adjustment of said focusing means for varying the angular displacement of said beams such that a proper focus by said focusing means of the image of a subject at a given subject distance is indicated by the intersection of said beams at the subject; and means for causing said first and second beams to carry information rendering respective areas on the subject illuminated by said beams distinguishable from each other to assist in indicating to the operator the direction in which angular adjustment of said beams should be made to bring them into convergence at the subject.

3. The apparatus defined by claim 2 wherein said first and second means include, respectively, a light source, a projection lens means for focusing said beam and a planar mirror arranged to deflect light from said source through said lens means, said light source constituting a lamp having a generally linear filament angled such that said first beam has an elongated cross section with its longest dimension along a first axis and said second beam has an elongated cross section with its longest dimension along a second axis disposed at an angle with respect to said first axis, said beams producing elongated, non-parallel areas of illumination on the selected subject.

4. The apparatus defined by claim 2 wherein said first and second beams include respective projection lens means for focusing said beams, said apparatus further including means responsive to an adjustment of said focusing means for causing a variation in said angular displacement of, and hence, a directional variation in the point of intersection of, said beams, and means for effecting a directionally corresponding variation in the foci of said projection lens means.

5. In a photographic camera having an exposure aperture on an optical axis for exposing photosensitive material in an image plane within the camera, range finding-focusing apparatus, comprising:

a plurality of lens means of different focal length for focusing the images of photographic subjects at different subject distances upon said plane;

mounting means for mounting said plurality of lens means for selective movement onto the optical axis;

range finding means for indicating the range of a selected photographic subject, comprising:

first means for projecting a first beam of light from the camera to the subject, and second means for projecting a second beam of light from the camera to the subject; and coupling means between said mounting means and at least one of said first and second means, said coupling means being responsive to movement of said mounting means for varying the angular separation between said beams such that the lens means providing proper focus on said image plane of the image of a subject at a given subject distance is indicated by the location of that lens means on said optical axis when said beams most nearly approach the condition of intersection at the subject.

6. The apparatus defined by claim 5 wherein said first and second means include, respectively, a light source, a projection lens means for focusing said beam, and a planar mirror arranged to deflect light from said source through said lens means.

7. The apparatus defined by claim 6 wherein each of said mirrors is rotatable around an axis proximate to the respectively associated lens means for effecting said angular variation in said beams, whereby as said angular displacement between said beams is varied by the rotation of said mirrors to displace the point of convergence of said beams with respect to the camera, the source-to-lens means distance is varied to effect a directionally corresponding displacement of the foci of said lens means.

8. The apparatus defined by claim 7 wherein said first and second means include means for causing said beams to carry information rendering respective areas on the subject illuminated by the beams distinguishable from each other to assist in indicating to the operator the direction in which angular adjustment of the beams should be made to bring them into convergence at the subject.

9. The apparatus defined by claim 8 wherein said light source constitutes a lamp having a generally linear filament angled such that said first beam has an elongated cross section with its longest dimension along a first axis and said second beam has an elongated cross section with its longest dimension along a second axis disposed at an angle with respect to said first axis, said beams producing elongated, non-parallel areas of illumination on the selected subject.

10. The apparatus defined by claim 9 wherein said angle between said axes is approximately 90°.

11. The apparatus defined by claim 10 wherein said lens means and said mounting means constitute integral parts of a single molded structure.

12. In a photographic camera having an exposure aperture on an optical axis for exposing photosensitive material in an image plane within the camera, range finding-focusing apparatus, comprising:

a plurality of lenses of different focal length for focusing the images of photographic subjects at different subject distances upon said image plane;

a rotatably mounted lens turret for mounting said lenses in angularly spaced relationship for selective movement onto said optical axis, said lenses and said turret constituting integral parts of a single transparent structure;

range finding means for indicating the range of a selected photographic subject, comprising:

first means for projecting a first angularly variable beam of light from the camera to the subject, and second means for projecting a second angularly variable beam of light from the camera to the subject;

coupling means between said first and said second means and a cam means rotatable with said lens turret, said coupling means being responsive to movement of said turret for varying said beams angularly with respect to each other in a plane containing both beams such that the lens providing proper focus of the image of a subject at a given subject distance is indicated by the location of that lens on said optical axis when said beams most nearly approach the condition of intersection at the subject; and a manually rotatable selector wheel on the opposed side of the exposure aperture from said lens turret and coupled thereto for rotation therewith, said wheel having indicia means for indicating that a certain one of said lenses is operably disposed on said optical axis.

13. The apparatus defined by claim 12 wherein said indicia means includes a plurality of orifices in said wheel, one orifice corresponding to each of said lenses in said lens turret and disposed in registration therewith.

14. For use with a photographic camera, range finding apparatus for ascertaining the range of a selected photographic subject, comprising:

first means for projecting a first beam of light from the camera to the subject;

second means for projecting a second beam of light from the camera to the subject;

control means for effecting an angular variation of at least one of said beams with respect to the other of said beams and in a plane containing both beams, the angular displacement of said beams when said beams are brought into convergence at the subject indicating the range of the subject, said first and second means including means for causing said beams to carry information rendering respective areas on the subject illuminated by said beams distinguished from each other to assist in indicating to the operator the direction in which angular adjustment of said beams should be made with said control means to bring said beams into convergence at the subject.

15. The apparatus defined by claim 14 wherein said first and second means include respective projection lens means for focusing said beams, said apparatus further including means responsive to an adjustment in said control means for causing a variation in said angular displacement of, and hence a directional variation in the point of intersection of, said beams, and means for effecting a directionally corresponding variation in the foci of said projection lens means.

16. The apparatus defined by claim 15 wherein each of said first and second means includes, in addition to said projection lens means, a light source and a planar mirror arranged to deflect light from said source through said respective lens means, each of said mirrors being mounted for rotation around an axis proximate to said respective lens means in response to adjustments in said control means for effecting said variations in the point of convergence of said beams and said directionally corresponding variations in the foci of said projection lens means.

17. The apparatus defined by claim 16 wheren said light source in said first and second means constitutes as a common element a lamp having a generally linear filament angled such that said first beam has an elongated cross section with its longest dimension along a first axis and said second beam has an elongated cross section with its longest dimension along a second axis disposed at an angle with respect to said first axis, said beams producing elongated, non-parallel areas of illumination on the selected subject.

18. For use with a photographic camera, range finding apparatus for indicating the establishment of a predetermined distance between a selected object and the apparatus, comprising:

means for projecting a first beam of light from the apparatus to the object;

means for projecting a second beam of light from the apparatus to the object, said beams having an angular displacement such that said beams converge at said predetermined distance from the apparatus;

means for causing said first and second beams to carry information rendering respective areas on the object illuminated by said beams distinguishable from each other to assist in indicating to the operator whether the range of the object from the apparatus is greater than or less than the said predetermined distance.

19. The apparatus defined by claim 18 wherein said means for causing said beams to carry said information includes means for shaping said first beam to have an elongated cross section with its longest dimension along a first axis and said second beam to have an elongated cross section with its longest dimension along a second axis, said means for causing said beams to carry said information including means for effecting an angular displacement between said first and second axes, whereby said beams produce elongated, non-parallel areas of illumination on the selected object.

20. The apparatus defined by claim 19 wherein said means for producing said first and second beams comprises incandescent lamp means, and wherein said lamp means includes elongated filament means constituting said means for shaping said beams to have said elongated cross sections.

References Cited
UNITED STATES PATENTS

| | | | |
|---|---|---|---|
| 2,239,379 | 4/1941 | Bucky | 95—44 |
| 3,006,262 | 10/1961 | MacMillin | 95—44 |
| 3,024,714 | 3/1962 | Keznickl | 95—44 |
| 3,274,914 | 9/1966 | Biedermann et al. | 95—44 |

NORTON ANSHER, *Primary Examiner.*

CHARLES B. FUNK, *Assistant Examiner.*

U.S. Cl. X.R.

95—44